United States Patent

Vandling

[11] 4,000,365
[45] Dec. 28, 1976

[54] APPARATUS FOR DETECTING A POOR FACSIMILE TRANSMISSION

[75] Inventor: John M. Vandling, Pleasantville, N.Y.

[73] Assignee: Exxon Research and Engineering Company, Linden, N.J.

[22] Filed: Jan. 30, 1974

[21] Appl. No.: 437,901

[52] U.S. Cl. .................. 358/256; 178/DIG. 12; 358/285
[51] Int. Cl.² ........................................ H04N 7/02
[58] Field of Search ............... 178/88, DIG. 12, 5, 178/6; 325/364, 64

[56] References Cited
UNITED STATES PATENTS

| | | | |
|---|---|---|---|
| 3,436,474 | 4/1969 | Saeger | 178/7.1 |
| 3,467,772 | 9/1969 | Crane | 178/6 |
| 3,820,026 | 6/1974 | Messinger | 325/364 |

*Primary Examiner*—Robert L. Griffin
*Assistant Examiner*—Edward L. Coles
*Attorney, Agent, or Firm*—N. Norris

[57] ABSTRACT

A facsimile receiver which may be acoustically coupled to a telephone transmission line comprises a preamplifier for amplifying frequency modulated signals. The output of the preamplifier is coupled to a demodulator comprising a single shot multivibrator and an average DC voltage detector connected to the output of the multivibrator. The output of the average DC voltage detector is applied to a stylus driver which controls the marking of a copy medium by a stylus. A signal quality detector and an indicator are coupled to the output of the preamplifier to provide an operator with an indication of poor signal reception quality.

9 Claims, 2 Drawing Figures

APPARATUS FOR DETECTING A POOR FACSIMILE TRANSMISSION

BACKGROUND OF THE INVENTION

This invention relates to data communications systems.

This invention also relates to facsimile systems comprising a transmitter, a receiver and a communications network therebetween. More particularly, this invention relates to a system wherein a document is scanned in a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

Typically, the communications network comprises ordinary telephone lines and the transmission over such lines may, at times, become substantially degraded. While such degradation in the quality of transmission can be tolerated in many telephone conversations, a facsimile transmission requires the maintenance of rather high transmission quality if an accurate facsimile or copy is to be obtained.

Heretofore, when a facsimile transmission has produced poor copy, the operator of the facsimile receiver was never really certain if the quality of the transmission had fallen below acceptable levels, the receiver was faulty, the transmitter was faulty or the original document being transmitted was of poor quality. In many cases, the operator has assumed a defective receiver when, in fact, the transmission was at fault, and this has resulted in unnecessary service calls. Where the receiver operator has informed the transmitter operator of the poor quality of the copy, the transmitter operator has, in some instances, initiated unnecessary service calls where the transmission was really at fault.

SUMMARY OF THE INVENTION

It is therefore an object of this invention to provide the operator of a data communications receiver with an indication as to the quality of the facsimile transmission.

It is a further object of this invention to provide the data communications receiver operator with such an indication so as to permit the operator to arrange for another transmission of the previously defectively transmitted data.

It is also an object of this invention to provide the data communications receiver operator with an indication so as to permit the operator of the transmitter or receiver to advise the transmission or telephone company for purposes of billing adjustment.

It is a further object of this invention to prevent unnecessary service calls for data communications transmitters and receivers.

In accordance with these and other objects of the invention, a data communications receiver for receiving signals from a remote location through a transmission means includes control means responsive to the received signals. The receiver further includes signal quality detector means for generating a signal representing the quality of the received signals while the control means are responding to the received signals and indicator means coupled to the signal quality detector means for actuating an alarm when the quality of the signals falls below a predetermined level. In a particularly preferred embodiment of the invention, the receiver is adapted to receive a facsimile transmission representing dark-light variations in a remotely located document wherein the control means comprises writing means for marking on a copy medium.

In accordance with one important aspect of the invention, the signal quality detector means comprises oscillator means for generating an oscillating signal when the amplitude of the signals received by the signal receiving means is below a predetermined level.

In accordance with another aspect of the invention, the indicator means may comprise light-emitting means coupled to the oscillator means such that the light-emitting means emits light in a periodic, flashing manner in response to oscillations of the oscillator means when the quality, e.g. amplitude, of the signals received by the signal receiving means is below a predetermined level. When the quality is above that level, the light-emitting means is continuously on so as to serve as a pilot light.

In accordance with another important aspect of the invention, the receiving means comprises frequency demodulating means for demodulating the frequency modulated signals. The oscillator means may comprise a free-running multivibrator oscillating between two semi-stable states. The signal quality detector means may comprise rectifier means forward biased by peaks of one polarity in the frequency modulated signals so as to apply control signals to the free-running multivibrator to maintain the multivibrator in one of the semi-stable states when the amplitude of the frequency modulated signals is above the predetermined level.

In accordance with a still further aspect of the invention, the signal receiving means comprises a preamplifier including a plurality of stages. The quality detector means is coupled to one of the stages operating in a substantially linear mode and capable of producing a maximum amplitude signal in excess of that required to forward bias the rectifier means of the signal quality detector means.

In accordance with yet another aspect of the invention, means are provided for selectively inhibiting the indicator means.

DETAILED DESCRIPTION OF A PREFERRED EMBODIMENT

Figure 1:
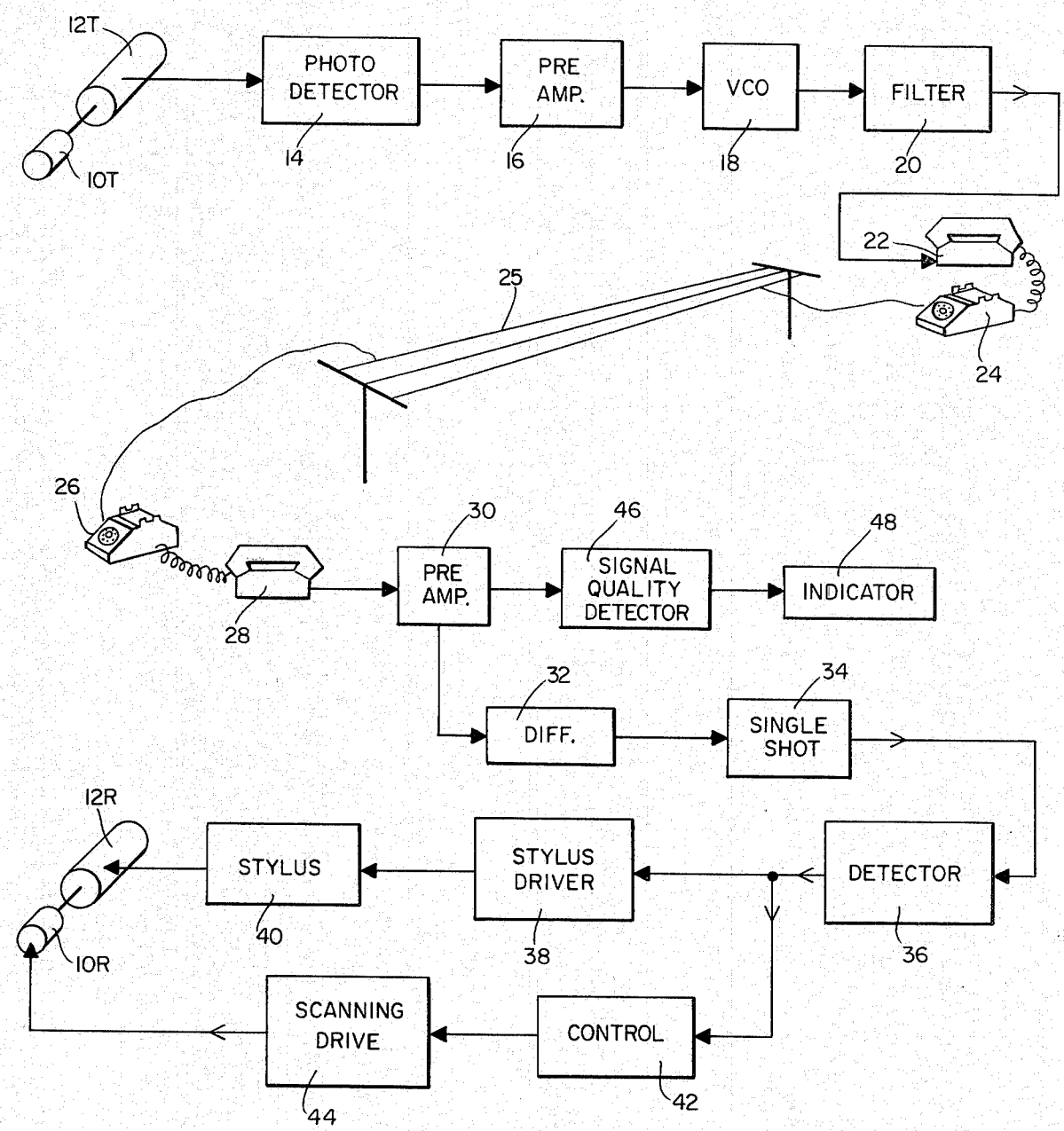
FIG. 1 is a block diagram of a facsimile system depicting a preferred embodiment of the invention.

Referring now to the facsimile system shown in FIG. 1, a facsimile transmitter comprises a drum 12T rotated by a motor 10T so as to create a relative scanning movement between a document carried by the drum 12T and a scanning head not shown. As the scanning head is advanced axially along the drum 12T when the drum rotates about its axis, successive paths on the document are illuminated and variations in light intensity due to variations in the reflectivity and absorption of the document are scanned by a photodetector 14. The photodetector 14 then converts these variations in light intensity into electrical signals. These electrical signals are amplified at a preamplifier 16 and utilized to control a VCO (voltage controlled oscillator) 18 to generate FM (frequency modulated) signals representing the information content of the document carried by the drum 12T. The FM signals are then conditioned by a filter 20 before being applied to an acoustical coupler 22 which is associated with a conventional telephone handset 24.

The FM signals are transmitted by suitable means such as conventional telephone voice grade communication lines 25 to a facsimile receiver which is coupled to another conventional telephone handset 26 and associated coupler 28. The receiver includes a preamplifier 30 which is coupled to a differentiating circuit 32 to generate trigger signals at each axis crossing point of received FM signals, which trigger signals are applied to an FM demodulator comprising a single shot multivibrator 34 as shown in copending application Ser. No. 417,797 filed Nov. 21, 1973 which is assigned to the assignee of this invention and incorporated herein by reference. The output of the single shot multivibrator 34 is coupled to a detector circuit 36 for determining the average DC value of the single shot output. A writing control signal generated at the output of the detector 36 is then coupled to a driver 38 for a stylus 40 associated with a movable head juxtaposed to a copy medium carried by the drum 12R. The relative scanning movement between the copy medium and the head is achieved by rotating the drum 12R by means of a motor 10R. A scanning motor 10R is coupled to a scanning drive 44 which is responsive to a scanning control 42 as described in the aforesaid copending application.

In accordance with this invention, a signal quality detector 46 is coupled to the preamplifier 30. The detector 46 is, in turn, coupled to an indicator 48 which is capable of signaling an alarm condition when the quality, in this case, the amplitude of the FM signals received by the receiver, falls below a predetermined level as determined by the signal quality detector 46.

Figure 2:
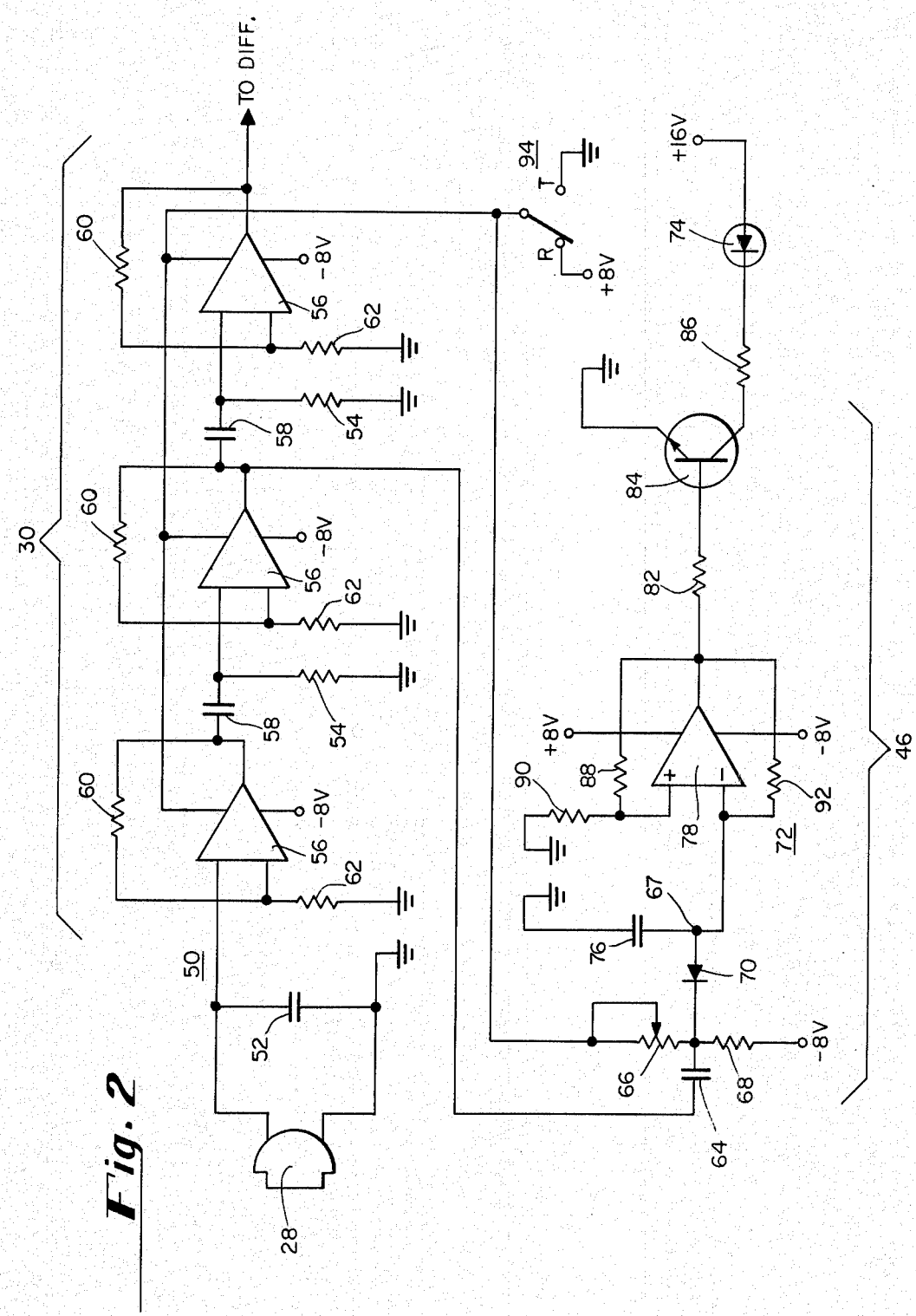
FIG. 2 is a schematic circuit diagram of portions of the system shown in FIG. 1.

Referring now to FIG. 2, the preamplifier 30, the signal detector 46 and the indicator 48 are shown in detail. More particularly, a three-stage preamplifier 30 is shown connected to the acoustical coupler 28 through an input filter 50 comprising a capacitor 52. The three stages of the amplifier 30 comprise operational amplifiers 56 which are AC coupled by capacitors 58. Feedback resistors 60 control the gain of the amplifiers 56 with resistors 54 and 62 connected between ground and the non-inverting and inverting terminals of the operational amplifiers 56.

In accordance with one important aspect of this invention, the output of the second stage of the preamplifier 30 is AC coupled through a capacitor 64 to the signal quality detector 46. The second stage is chosen since the operational amplifier 56 of this stage is characterized by substantially stable, linear operation producing a signal of sufficient peak-to-peak amplitude, e.g., at least one volt, so as to permit reliable detection of the failure of the voltage to reach peak-to-peak amplitude in excess of a predetermined level.

The predetermined level of amplitude is determined by voltage divider circuitry comprising a potentiometer 66 in series with a resistor 68 having a junction connected to the coupling capacitor 64. Rectifying means in the form of a diode 70 are provided which is also connected to a junction 67 between the potentiometer 66 and the resistor 68 so as to be forward biased when the junction is driven negative by the AC FM signal applied to the junction through the capacitor 64. By utilizing power supplies of +8 and −8 volts and appropriately adjusting the potentiometer 66, the rectifier 70 will conduct the negative peaks of the AC FM signal coupled through the capacitor 64 and this forward biasing of the diode 70 will prevent a free-running multivibrator 72 from oscillating between the two semi-stable states and this, in turn, will prevent the flashing of light by a light-emitting diode 74 which forms the indicator 48 and doubles as a pilot light for the receiver.

The oscillator or free-running multivibrator 72 comprises a capacitor 76 connected between the junction 67 and ground. As long as the peak-to-peak amplitude of the AC FM signal is sufficiently large such that the negative peaks of that signal forward bias the diode 70, a negative charge is maintained on the capacitor 76. The negative voltage across the capacitor 76 is applied to an inverting terminal of an operational amplifier 78 so as to produce a positive output from the operational amplifier 78 which, in turn, is applied to a resistor 82 to forward bias the transistor 84 so as to permit the flow of current through the light-emitting diode 74 and a series connected resistor 86. The positive output from the operational amplifier 78 provides a relatively small positive input to the non-inverting terminal of the operational amplifier 78 by means of a positive feedback resistor 88 which forms a voltage divider with a resistor 90 connected between the non-inverting terminal and ground.

When the peak-to-peak voltage of the FM signal fails to reach the predetermined level, the negative peaks of that signal do not forward bias the diode 70 and the negative charge in the capacitor 76 begins to decline. As a result, the inverting terminal of the operational amplifier 78 becomes more positive until the output of the operational amplifier 78 goes negative. At this time, the transistor 84 becomes non-conductive and the flow of current through the light-emitting diode 74 is terminated. Simultaneously, a negative charge begins to accumulate on the capacitor 76 again via a negative feedback resistor 92. When the inverting terminal of the operational amplifier 78 becomes sufficiently negative, the output of the operational amplifier 78 again goes positive and this results in conduction of the transistor 84 and the light-emitting diode 74. It will therefore be seen that when the amplitude of the FM signal becomes sufficiently small such that the negative peaks of the signal are unable to forward bias diode 70, the free-running multivibrator 72 will oscillate between two semi-stable states and this, in turn, will produce a flashing of the light-emitting diode 74. The flashing of the diode 74 will continue until the amplitude of the FM signal rises above the predetermined level and the diode 70 again conducts in response to the negative peaks of that FM signal.

With the flashing of the light-emitting diode 74, preferably at a frequency chosen to command attention, e.g., 1–10 Hz., the operator of the facsimile receiver becomes immediately aware of the poor quality of the received signal and may request that the communications link be reestablished in the hope of improving the signal quality. At the same time, the operator of the communications link (typically a telephone operator) would be requested not to bill the parties for the defective transmission. This procedure might be repeated until the quality of the transmission was satisfactory. Note that the facsimile receiver operator would know, upon observing the flashing alarm produced by the light-emitting diode 74, that the poor transmission was not the fault of the facsimile receiver and would not therefore initiate an unnecessary service call for the facsimile receiver. The receiver operator would also know that the poor transmission was not the result of the document since the quality of the document could not actuate the alarm condition. It will be understood that the alarm condition could be actuated by a faulty transmitter which was generating FM signals of insufficient amplitude. However, if a new connection removed the alarm condition, the transmitter could be absolved of fault. If the second or new connection did not remove the alarm condition, this would not necessarily mean that the transmitter was faulty since the new connection might also be of unacceptable quality. The alarm condition with the new connection might also indicate the improper placement of the telephone handset 26 in the acoustic coupler 28.

In many cases the receiving circuitry of FIG. 2 will be combined with circuitry having a transmitting capability such as that illustrated in the upper portion of the block diagram in FIG. 1 so as to provide a facsimile transceiver. In such cases, it is desirable to inhibit the flashing of the light-emitting diode 74 when the transmitting circuitry associated with the receiving circuitry of FIG. 2 is operating in the transmitting mode so as to allow the light-emitting diode 74 to function as a pilot light in the transmitting mode as well as the receiving mode. However, the absence of an acoustical signal at the transducer 28, which will occur during the transmitting mode, will appear as a signal of zero amplitude and would initiate oscillations in the oscillator which would in turn cause flashing of the diode 74. In order to inhibit this flashing, a function switch 94 is provided as shown in FIG. 2. When the transceiver is operated in the receiving mode, the switch 94 is in the R position as shown so as to apply the +8 volt supply to the operational amplifier 56 and the potentiometer 66. This permits the light-emitting diode 74 to serve its pilot light alarm function. When the transceiver is operated in the transmitting mode, the switch 94 is in the T position so as to connect the operational amplifiers 56 and the potentiometer 66 to ground. This in turn lowers the potential at the junction of the potentiometer 66 and the resistor 68 to a substantial negative potential which forward biases the diode 70 so as to maintain a negative charge on the capacitor 76 to prevent oscillations and flashing.

Specific values and types of specific components utilized in the circuit of FIG. 2 are set forth in the following table:

C52 — .33μf.
C58 — .01μf.
C64 — .33μf.
C76 — .47μf.
R54 (2nd stage) — 4.7KΩ
R54 (3rd stage) —
R60 (1st stage) — 33KΩ
R60 (2nd stage) — 1MΩ
R60 (3rd stage) — 1MΩ
R62 (1st stage) — 150Ω
R62 (2nd stage) — 4.7KΩ
R62 (3rd stage) — 10KΩ
R66 — 10KΩ
R68 — 10KΩ
R82 — 3.3KΩ
R86 — 470Ω
R88 — 100KΩ
R90 — 1KΩ
R92 — 680KΩ
O84 — 2N4123
LED74 — HP5082-4850
Op. Amp. 56–741
Op. Amp. 78–741

In the foregoing, a specific system has been disclosed for detecting poor signal strength as a function of amplitude. It will, of course, be appreciated that the facsimile receiver might be provided with a signal quality detector capable of detecting a degradation of the acceptable channel bandwidth characteristics. The detector could also provide an indication of unacceptable channel signal-to-noise ratio and other transmission difficulties including unacceptable variations in transmission delay over the frequency band of interest. Also, it would be possible to utilize such a system with other types of modulation and demodulation systems; e.g., amplitude modulation systems. It is also possible to utilize such a system in conjunction with transmissions other than facsimile transmissions.

Although a particular embodiment of the invention has been shown and described and various modifications have been suggested, it will be understood that the true spirit and scope of the invention as set forth in the appended claims embrace other modifications and embodiments which will occur to those of ordinary skill in the art.

What is claimed is:

1. A facsimile receiver for receiving modulated signals from a remote location representing dark-light variations in a document at said remote location, said receiver comprising:
   writing means for marking on a copy medium;
   signal receiving means coupled to said writing means for demodulating said modulated signals and actuating said writing means so as to mark said copy medium when signals representing dark regions are received;
   scanning means for moving said writing means relative to said copy medium;
   signal quality detector means coupled to said receiving means for generating a signal representing the quality of modulated signals while said writing means is actuated in response to said demodulated signals; and
   indicator means coupled to said signal quality detector means for actuating an alarm when the quality of signals falls below a predetermined level.

2. The receiver of claim 1 wherein said indicator means comprises light-emitting means, said light-emitting means constantly emitting light when the signal quality as detected by said signal quality detector means is above a predetermined level and intermittently emitting light when the signal quality as detected by said signal quality detector means falls below the predetermined level.

3. The receiver of claim 1 including means for selectively inhibiting the indicator means.

4. The receiver of claim 3 wherein said signal quality detector means comprises oscillator means for generating an oscillating signal when the quality of the received signal is below said predetermined level and said alarm means comprises light-emitting means flashing in response to said oscillating signals and continuously emitting light when the quality of the received signal is above said predetermined level, said inhibiting means being coupled to said oscillating means to selectively inhibit oscillation of said oscillating means even when the quality of the received signal is below said predetermined level.

5. The receiver of claim 1 wherein said receiving means comprises frequency demodulation means for demodulating frequency modulated signals, said signal quality detector means including means for detecting the amplitude of the frequency modulated signals, said indicator means actuating said alarm when the amplitude of said frequency modulated signals falls below a predetermined level.

6. The receiver of claim 5 wherein said signal quality detector means comprises:
  oscillator means for generating an oscillating signal when the amplitude is below a predetermined level, said oscillating signal terminating when the amplitude is above said predetermined level.

7. The receiver of claim 6 wherein said indicator means comprises light-emitting means coupled to said oscillator means, said light-emitting means emitting light in a periodic flashing manner in response to oscillations of said oscillator means when the amplitude is below a predetermined level and emitting light in a continuous manner when the oscillations from said oscillator means terminate and the signal is above said predetermined level.

8. The receiver of claim 7 wherein said oscillator means comprises a free-running multivibrator oscillating between two semi-stable states, said signal quality detector means comprising rectifier means forward biased by peaks of one polarity in the frequency modulated signal so as to apply a control signal to said free-running multivibrator to maintain said multivibrator in one of said semi-stable states.

9. The receiver of claim 8 wherein said receiver means further comprises preamplification means having a plurality of stages, said signal quality detector means being coupled to one of said stages operating in a stable, substantially linear mode.

* * * * *